L. BASTRUP.
LATHE DOG.
APPLICATION FILED MAR. 8, 1916.
1,237,153.
Patented Aug. 14, 1917.
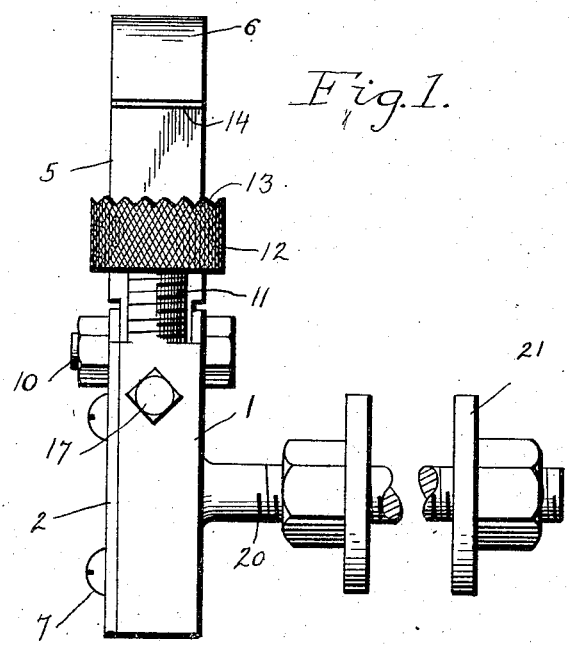
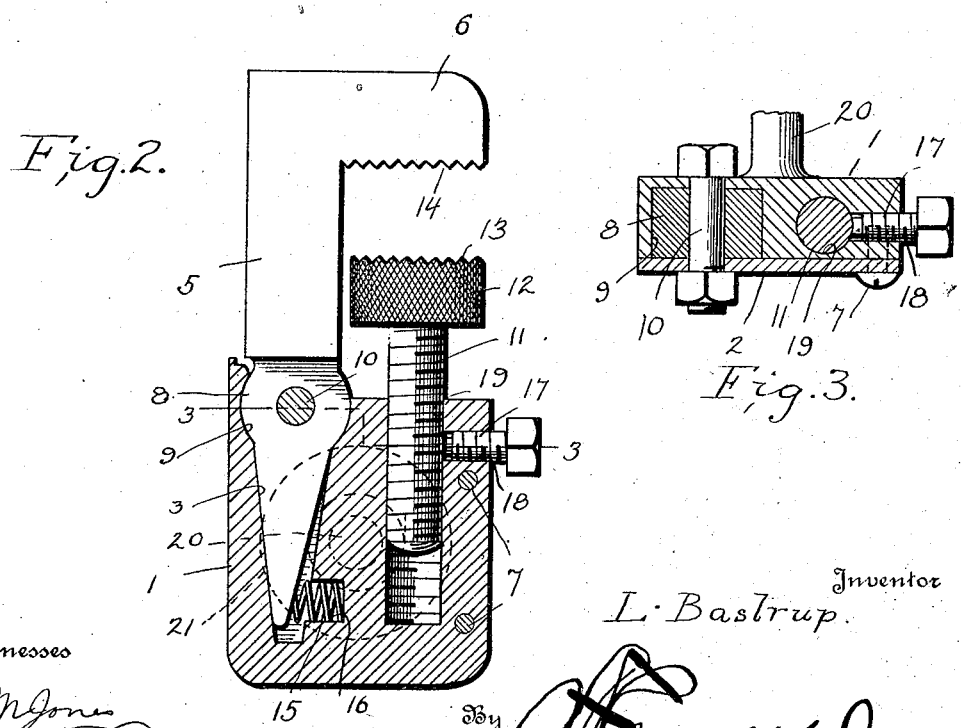
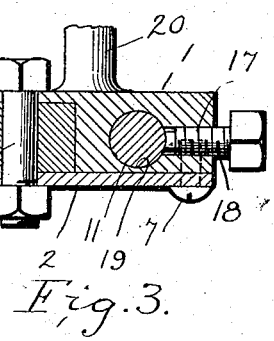
Witnesses
Inventor
L. Bastrup.
By
Attorney

UNITED STATES PATENT OFFICE.

LAURITZ BASTRUP, OF KENOSHA, WISCONSIN.

LATHE-DOG.

1,237,153.  Specification of Letters Patent.  Patented Aug. 14, 1917.

Application filed March 8, 1916. Serial No. 82,946.

*To all whom it may concern:*

Be it known that I, LAURITZ BASTRUP, a subject of the King of Denmark, residing at Kenosha, in the county of Kenosha and State of Wisconsin, have invented certain new and useful Improvements in Lathe-Dogs; and I do hereby declare the following to be a full, clear, and exact description of the invention, such as will enable others skilled in the art to which it appertains to make and use the same.

The invention relates to improvements in lathe dogs.

The object of the present invention is to improve the construction of lathe dogs and to provide a simple, practical and comparatively inexpensive lathe dog of strong and durable construction adapted to save time and labor in placing work in and removing the same from a lathe dog and capable after it has been set to a predetermined size or adjustment of enabling objects or pieces of work of a certain size to be instantly placed in and removed from the lathe dog without altering the adjusting means.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction within the scope of the claims may be resorted to without departing from the spirit or sacrificing any of the advantages of the invention.

In the drawing

Figure 1 is a front elevation of a lathe dog constructed in accordance with this invention, Fig. 2 is a vertical longitudinal sectional view of the same, Fig. 3 is a horizontal sectional view taken substantially on the line 3—3 of Fig. 2.

In the accompanying drawing in which is illustrated the preferred embodiment of the invention, the lathe dog comprises in its construction a base 1 consisting of a block having a removable side or face plate 2 and provided with a recess 3 tapered downwardly as clearly illustrated in Fig. 2 of the drawing to receive a tapered portion 4 of the shank 5 of a spring jaw 6. The side or face plate 2 is detachably secured to the body or block of the base by suitable screws 7 and the tapered shank is enlarged at the upper portion at 8 to form a knuckle which is arranged in a bearing portion 9 of the recess 3 and pierced by a pivot bolt 10 which also passes through the block and the face plate of the base 1. By this construction the shank of the jaw 6 is pivotally mounted on the base and is adapted to have a limited movement toward and from an adjusting screw 11 which is provided with a checkered head 12 having a toothed engaging face 13 to operate with a similar engaging face 14 of the spring jaw 6. The spring jaw 6 is maintained yieldably at the limit of its forward movement by a coiled spring 15 located at the lower portion of the recess 3 and bearing against the lower end of the tapered portion 4 of the shank 5. The coiled spring is seated in a socket in the inner wall of the recess 3 and it urges the tapered portion 4 of the shank rearwardly. Any other form of spring may of course be employed for maintaining the jaw 6 yieldably in its engaging position and for permitting the jaw to be swung upwardly and rearwardly to release the work and enable the same to be instantly removed from the lathe dog without changing the adjustment of the screw 11. The screw 11 is secured in its adjustment by a set screw 17 preferably constructed of brass and mounted in a threaded opening 18 in the front of the block of the base which has a vertical threaded opening 19 for the adjusting screw 11. The base is provided with a horizontal threaded stud 20 extending from one side of the block and receiving nuts 21 for securing the lathe dog to a lathe plate.

The lathe dog is not only adapted to effect a saving of labor in placing work in and removing it from the dog but it is also adapted to support work more solidly than an ordinary lathe dog. Another advantage of the invention is that the lathe dog can be constructed for an adjustment from zero to an inch and other dogs from 1 to 2 inches so that only one dog will be necessary for each adjustment and each dog will take any work within its particular adjustment. The vertical shank of the spring jaw is located in rear of the vertical screw and the jaw 6 extends inwardly over the head or jaw of the screw and is in convenient position to be readily grasped for manipulating it in placing work in and removing the same from the lathe dog.

What is claimed is:—

1. A lathe dog including a base provided with a vertical threaded opening and having a recess in rear of the opening, an adjusting screw mounted vertically in the threaded opening of the base and provided at its upper end with a head forming an adjustable jaw and having a horizontally disposed engaging face, and a movable jaw arranged horizontally above the jaw of the screw and having an engaging face normally arranged in parallelism with the engaging face of the adjustable jaw and provided with an approximately vertical shank pivoted in the said recess of the base in rear of the vertical screw and a spring for urging the jaw of the shank forwardly and for maintaining the same in its engaging position.

2. A lathe dog including a base provided with a vertical threaded opening and having a recess arranged substantially vertically in rear of said opening and having an upper bearing portion and a lower tapered portion, a vertically disposed screw mounted in the threaded opening and having a horizontal engaging upper face, a movable jaw composed of an arm having a lower engaging face arranged in substantial parallelism with the engaging face of the screw and a substantially vertical shank having a tapered portion at the lower end to extend into the said recess and provided above the tapered portion with a rounded knuckle, the latter being pivoted in the bearing portion of the said recess and a spring engaging the lower tapered portion of the said shank at the front thereof.

3. A lathe dog including a base consisting of a block provided with a vertical threaded opening and having a recess in rear of the said opening and a face plate secured to the block and covering the recess, said plate being removable to afford access to the recess, a horizontal stud rigid with and extending from the opposite side of the block from that in which the recess is located, a vertical adjusting screw mounted in the threaded opening of the block and provided at its upper end with a head forming an adjustable jaw, having a horizontal engaging face, a substantially vertical shank or bar pivoted in the recess at a point intermediate of its ends and provided at the top with a forwardly extending jaw located above the jaw of the screw and having an engaging face arranged normally in substantial parallelism with the engaging face of the adjustable jaw, and a spring arranged within the base and engaging the lower portion of the shank or bar or urging the jaw thereof forwardly.

4. A lathe dog including a block provided at one side with a threaded horizontally projecting stud and having a recess open at the opposite side of the block, the latter being also provided in advance of the recess with a vertical threaded opening, a face plate secured to the block and extending over the said recess, nuts mounted on the said stud for securing the block to a lathe plate, a vertically disposed adjusting screw mounted in the threaded opening of the block and provided at its upper end with a head forming a jaw having a horizontal engaging face and a spring actuated shank or bar pivoted in the recess of the block in rear of the screw and extending above the same and having a jaw projecting over the head of the screw with a horizontal face normally arranged in substantial parallelism with the engaging face of the screw.

In testimony whereof I affix my signature in presence of two witnesses.

LAURITZ BASTRUP.

Witnesses:
 FRANK P. MILLER,
 CARL W. OLSEN.

Copies of this patent may be obtained for five cents each, by addressing the "Commissioner of Patents Washington, D. C."